United States Patent
Lie et al.

(10) Patent No.: US 9,967,369 B2
(45) Date of Patent: May 8, 2018

(54) CONNECTION BASED BANDWIDTH OPTIMIZATION OF DATA PACKETS

(71) Applicant: Invensys Systems, Inc., Foxboro, MA (US)

(72) Inventors: Shiewun Lie, Mission Viejo, CA (US); Vinay T. Kamath, Rancho Santa Margarita, CA (US); Yevgeny Naryzhny, Foothill Ranch, CA (US); Abhijit Manushree, Laguna Niguel, CA (US); Elliott Middleton, Tyler, TX (US); Bala Kamesh Sista, Irvine, CA (US)

(73) Assignee: Schneider Electric Software, LLC, Foxboro, MA (US)

( * ) Notice: Subject to any disclaimer, the term of this patent is extended or adjusted under 35 U.S.C. 154(b) by 152 days.

(21) Appl. No.: 14/970,086

(22) Filed: Dec. 15, 2015

(65) Prior Publication Data

US 2016/0173655 A1 Jun. 16, 2016

Related U.S. Application Data

(60) Provisional application No. 62/092,063, filed on Dec. 15, 2014.

(51) Int. Cl.
*H04L 12/28* (2006.01)
*H04L 29/06* (2006.01)
*H04L 29/08* (2006.01)

(52) U.S. Cl.
CPC ............. *H04L 69/04* (2013.01); *H04L 67/12* (2013.01)

(58) Field of Classification Search
CPC .................. H04L 69/04; H04L 67/12
See application file for complete search history.

(56) References Cited

U.S. PATENT DOCUMENTS

| 6,198,480 B1 * | 3/2001 | Cotugno | G05B 19/0426 |
| | | | 715/207 |
| 6,799,195 B1 * | 9/2004 | Thibault | G05B 19/41835 |
| | | | 700/4 |

(Continued)

*Primary Examiner* — Robert Wilson
(74) *Attorney, Agent, or Firm* — Senniger Powers LLP

(57) ABSTRACT

A system for communicating data packets in a process control environment is described. A client device connects, via the network, to an historian device, creates, via a first dictionary manager module, a first tag dictionary, synchronizes, via the network, the first tag dictionary with a second tag dictionary created by the historian device, optimizes a packet via a packet optimization layer comprising scanning a tag ID present in the packet, determines a matching tag handle for the tag ID from the first tag dictionary, replaces each instance of the tag ID in the packet with the matching tag handle, and sends the optimized packet to the historian device via the network. The historian device connects, via the network, to the client device, creates, via a second dictionary manager module, the second tag dictionary, synchronizes, via the network, the second tag dictionary with the first tag dictionary created by the client device, receives the optimized packet from the client device via the network, converts the optimized packet back to its original form comprising scanning a tag handle present in the packet, determines a matching tag ID for the tag handle from the second tag dictionary, and replaces each instance of the tag handle in the packet with the matching tag ID.

21 Claims, 4 Drawing Sheets

(56) References Cited

U.S. PATENT DOCUMENTS

| | | | |
|---|---|---|---|
| 7,761,923 B2 * | 7/2010 | Khuti | H04L 63/02 726/11 |
| 2011/0179341 A1 * | 7/2011 | Falls | H03M 7/3086 714/807 |
| 2013/0124465 A1 * | 5/2013 | Pingel | G06F 3/0604 707/610 |
| 2016/0173649 A1 * | 6/2016 | Kamath | G06Q 10/06 709/203 |
| 2016/0173655 A1 * | 6/2016 | Lie | H04L 69/04 370/392 |

* cited by examiner

CONNECTION BASED BANDWIDTH OPTIMIZATION OF DATA PACKETS

CROSS-REFERENCE

This application claims the benefit of U.S. provisional patent application Ser. No. 62/092,063 filed Dec. 15, 2014, which is incorporated herein in its entirety by reference.

Co-pending, co-owned U.S. patent application Ser. No. 14/970,062, entitled Historical Summarization in a Process Control Environment, filed on the same day as this application, and which claims the benefit of U.S. provisional patent application Ser. No. 62/092,057 filed Dec. 15, 2014, is incorporated herein in its entirety by reference. Co-pending, co-owned U.S. patent application Ser. No. 14/970,076, entitled Optimistic Data Retrieval in a Process Control Environment, filed on the same day as this application, and which claims the benefit of U.S. provisional patent application Ser. No. 62/092,059 filed Dec. 15, 2014, is incorporated herein in its entirety by reference.

BACKGROUND

Industry increasingly depends upon highly automated data acquisition and control systems to ensure that industrial processes are run efficiently, safely, and reliably while lowering their overall production costs. Data acquisition begins when a number of sensors measure aspects of an industrial process and periodically report their measurements back to a data collection and control system. Such measurements come in a wide variety of forms. By way of example, the measurements produced by a sensor/recorder include: temperature, pressure, pH, and mass/volume flow of material, as well as a tallied inventory of packages waiting in a shipping line and/or a photograph of a room in a factory. Such process systems generate large and varied quantities of data which can put a great strain on communications networks during transmission to storage devices. Ensuring efficient, effective transmission of data is an important part of running an efficient process and reducing general bandwidth usage can result in lower costs and a smaller likelihood of valuable data being lost.

SUMMARY

Briefly, aspects of the present invention relate to the optimization and transmission of process data in packet form through a network connection. Further aspects involve transmitting compressed, optimized data packets from a client device to a historian server device. The transmitted data packets are optimized in such a way as to reduce the size of the packets and emphasize efficient bandwidth use.

In one aspect, a system for communicating data packets in a process control environment is described. The system comprises a client device and historian device and a network connection between the two devices. The client device comprises a memory storage device and a processor, wherein the memory storage device stores processor-executable instructions and the processor executes the processor-executable instructions. The instructions of the client device comprise instructions for connecting, via the network, to the historian device, creating, via a first dictionary manager module, a first tag dictionary, synchronizing, via the network, the first tag dictionary with a second tag dictionary created by the historian device, optimizing a packet via a client packet optimization module comprising scanning a tag ID present in the packet, determining a matching tag handle for the tag ID from the first tag dictionary, replacing each instance of the tag ID in the packet with the matching tag handle, and sending the optimized packet to the historian device via the network. The historian device comprises a memory storage device and processor, wherein the memory storage device stores processor-executable instructions and the processor executes the processor-executable instructions. The instructions of the historian device comprise connecting, via the network, to the client device, creating, via a second dictionary manager module, the second tag dictionary, synchronizing, via the network, the second tag dictionary with the first tag dictionary created by the client device, receiving the optimized packet from the client device via the network, converting the optimized packet back to its original form comprising scanning a tag handle present in the packet, determining a matching tag ID for the tag handle from the second tag dictionary, and replacing each instance of the tag handle in the packet with the matching tag ID.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Aspects of the present invention generally relate to the fields of transferring data between devices efficiently in a process control environment. A process control environment includes a facility or factory containing equipment that facilitates the automation of a process. In an embodiment, the process is for the manufacture or production of products, including goods for sale or ingredients for use in other processes or the like. Products produced are mechanical, chemical, or electrical in nature, or some combination thereof. The environment includes equipment necessary to facilitate the process, as well as equipment to automate the process. The equipment includes, for example, controllers for organizing and directing the other equipment in the process, actuators for physically or electrically causing actions directed by the controllers, sensors for gathering information about the process to provide feedback to the controllers, and the like. The process control environment according to embodiments of the invention includes interface devices that enable users to view information about the process and direct the behavior of the controllers and thereby, the behavior of the other equipment in the process. An interface device comprises, for example, a personal computer, server computer, mobile device, or the like.

Figure 1:
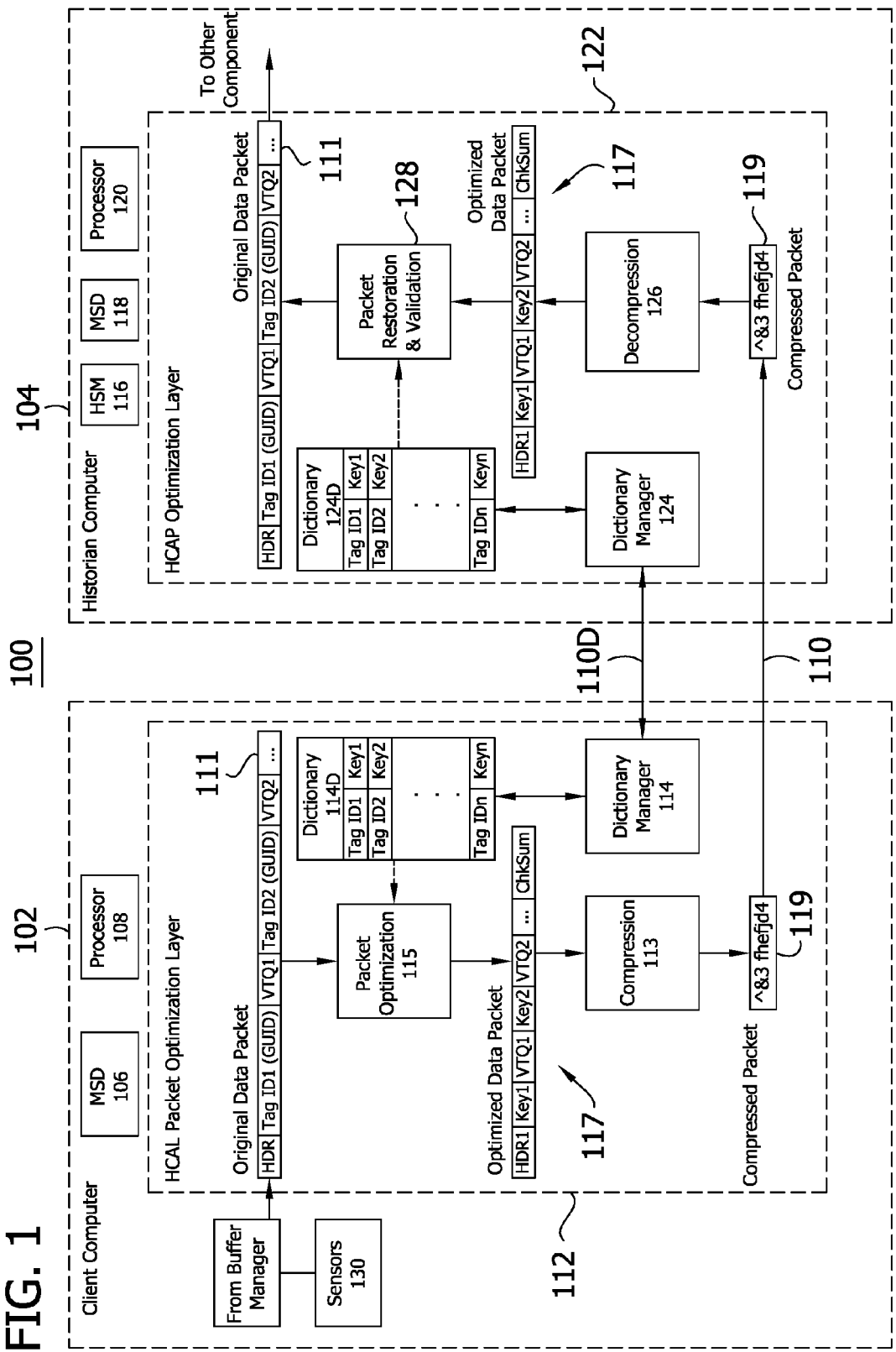
FIG. 1 is a block diagram of a client device 102 and a historian device 104 and included modules.

In an embodiment, the process control system 100 includes a client device 102 and a historian device 104. FIG. 1 shows an exemplary block diagram of a relationship between the client device 102 and the historian device 104 including modules in both devices. The client device 102 is, for example, a stationary computer, mobile device, or some other type of device in the process control system 100 which sends data to the historian device 104 for storage. Preferably, the client device 102 comprises at least a memory storage device (MSD) 106 and a processor 108. The client device 102 in an embodiment also includes an interface 110 through which data may be communicated to the historian device 104 or other devices in the system 100. The memory storage device 106 of the client device 102 contains processor-executable instructions for the operation of the client device 102. The processor 108 is configured to execute the instructions to cause the client device 102 to operate.

The client device 102 comprises a client packet optimization layer 112 (historian client access layer HCAL) which reduces the size of data packets sent through the communication interface in order to optimize network bandwidth usage. The client packet optimization layer 112 executes several operations on an original data packet 111 to reduce its size to a compressed packet 119, including a compression module 113 which can use a tag dictionary 114D managed by a dictionary manager module 114 to swap out tag IDs. Additionally, the client packet optimization layer 112 includes a packet optimization module 115 which generates an optimized data packet 117 including a checksum which is sent with the packet 117 that has been optimized so that the receiver of the compressed packet 119 may verify the integrity of the information in the compressed packet 119.

The process control system 100 in the illustrated embodiment of FIG. 1 also includes a historian device 104. The historian device 104 is passed data that is gathered from the process for storage and processing. An important part of an effective process control system 100 is the analysis of data from the process by the historian device 104 in order to make educated decisions about how to improve the process. The historian device 104 comprises, for example, a historian server module (HSM) 116 that stores historical data for later use and analysis. The historian device 104 further comprises, for example, one or more memory storage devices 118 that store the data gathered from the process and processer-executable instructions, and a processor 120 for executing the instructions. In turn, the processer-executable instructions direct the operation of the historian device 104.

The historian device 104 also includes a historian packet optimization layer 122 (historian client access point HCAP) for use when compressed processing packets 119 received from the client 102 that have been optimized. The historian packet optimization layer 122 has a dictionary manager module 124 which manages a tag dictionary 124D. The historian packet optimization layer 122 executes a decompression module 126 on received packets 119 to generate the optimized data packet 117 which is restored and validated into the original data packet 111 by a packet restoration and validation module 128. Received packets 119 that have been processed by the historian packet optimization layer 122 into the original data packet 11 are then sent by the processor 120 to their destination within the historian device 104, which is likely to be the server module 116 where the gathered process data is stored.

The interface 110 through which data may be communicated from the client device 102 to the historian device 104 or other devices in the system 100 includes a network connection between a client device 102 and historian device 104 which may be over any type of communication network. In one form, the interface 110 includes a link 110D between the client dictionary manager 114 and the historian dictionary manager 124 so that the two dictionaries 114D and 124D are up to date and consistent with each other. The network may be either wired or wireless and either private or public. It may include use of the World Wide Web or other large network. Because the network connection is flexible, the client device 102 and historian device 104 are configured to connect to devices that are far removed from their locations. The historian device 104 and client device 102 could be in the same room, or on separate continents. The connection between the historian device 104 and client device 102 preferably connects in a typical manner of two devices connecting via a network.

The compressed data packets 119 that are sent over the network connection are formatted units of data which contain the data to be sent, or payload, and control information that is used by the network to properly deliver the packet 119. This information can include source and destination addresses, error detection codes, and sequencing information. In some cases, the size of packets may be limited based on the protocol being used.

In an embodiment, both the client device 102 and the historian device 104 comprise dictionary manager modules 114, 124 which maintain tag dictionaries 114D, 124D. The data typically sent within the system 100 consists largely of data values from the process and tag IDs for each value which specify what sensor or other device the data value originated from. Because the process contains many different sensors 130 from which to gather data values and it is desirable that each data source has a unique tag ID, tag IDs may be quite long. In an embodiment, the tag IDs are Globally Unique Identifiers (GUIDs), which are 128-bit values and commonly displayed as 32 hexadecimal digits. The sensors 130 may be gathering data values many times per minute or per second, resulting in data packets which contain many iterations of a tag ID repeatedly. It is preferable to reduce the size of the original data packets 111 by swapping the long, repeated tag IDs with a tag handle stored in dictionary 114D, which is a value that represents the tag ID but is shorter than the tag ID. Tag handles are assigned to tag IDs when the dictionary manager module populates the tag dictionary. The tag dictionary preferably contains each tag ID and a matching tag handle which refers to the tag ID. By swapping tag IDs for tag handles, the size of packets can be reduced significantly. In an embodiment, the dictionary manager module may assign tag handles that are 4 digits long to take the place of GUID-sized tag IDs (e.g., key1, key2). Other sizes of tag handles are also possible.

Figure 2:
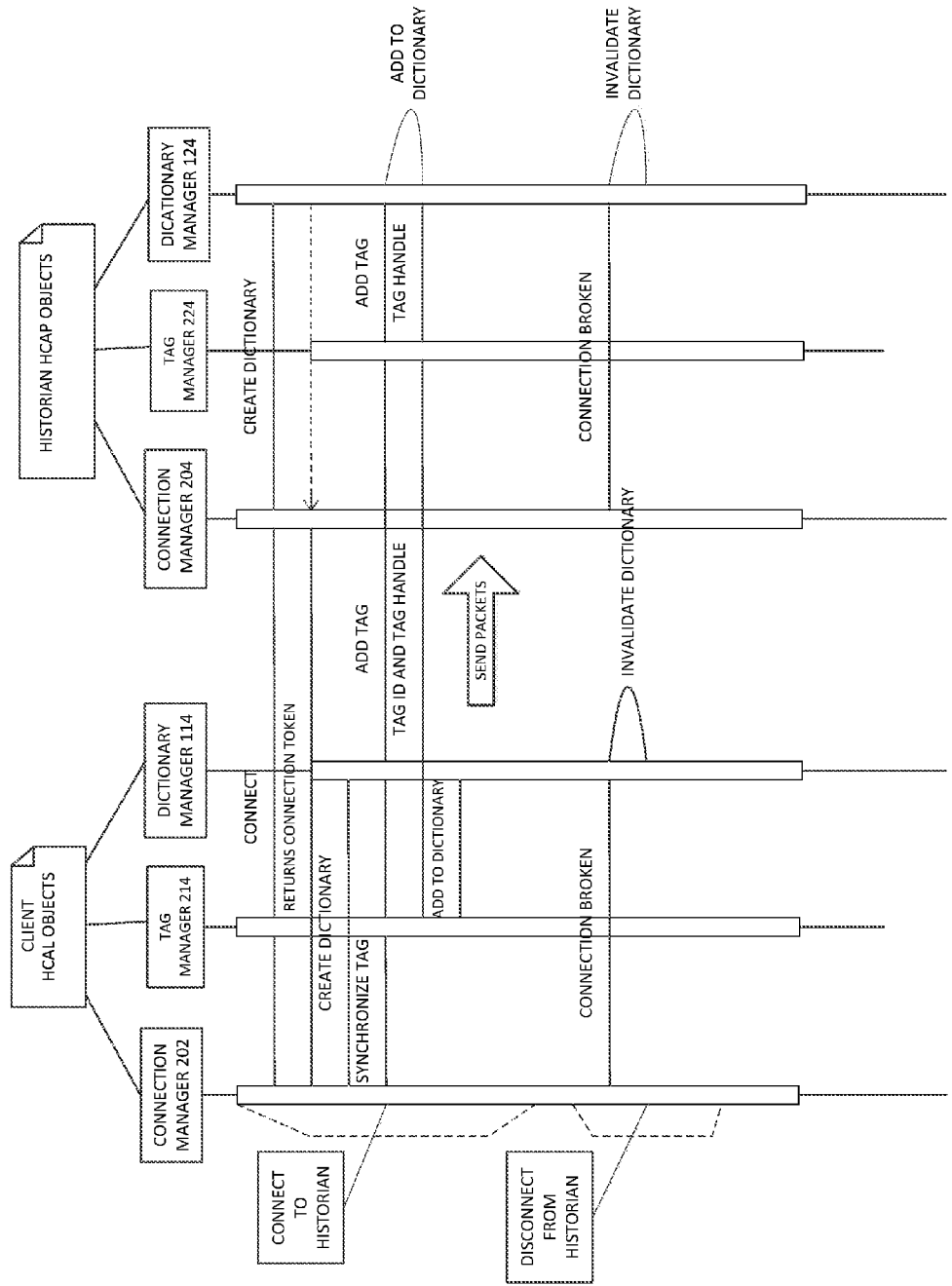
FIG. 2 is a sequence diagram of a connection process and disconnection process between a client device 102 and a historian device 104.

FIG. 2 is an exemplary sequence diagram describing the operations of the client processor 108 and the historian processor executing their respective processor executable instructions to connect the client device 102 to the historian device 104 and then to disconnect the client device 102 from the historian device 104. The client device 102 sends via a client connection manager 202 a connection message to a historian connection manager 204 of the historian device 104. In response, the historian device 104 creates a tag dictionary 124D using the historian dictionary manager 124 including a tag manager 224 by executing the dictionary manager module 124 which communicates with the client dictionary manager 114 including a tag manager 214 via link 110D. The historian device 104 then responds to the connection message with a connection token. The historian device 104 returns the connection token to the client device 102 and creates a tag dictionary in the dictionary manager module of the client device 102. The client device 102 and historian device 104 synchronize their dictionaries 114D, 124D. The client device 102 sends tag IDs to the historian device 104. Preferably, the client device 102 has information about what tag IDs are likely to be present in the packets 119 that will be sent over the connection. The historian device 104 receives the tag IDs and for each tag ID, generates a tag handle. Both the tag IDs and tag handles are added to the dictionary 124D of the historian device 104. The historian device 104 sends the generated tag handles back to the client device 102 and the client device 102 also adds the tag IDs and matching tag handles to its dictionary 114D. When the dictionaries are synchronized, the client device 102 can then begin sending optimized, compressed packets 119 to the historian device 104.

When the client device 102 has completed sending packets to the historian device 104, it will break the connection off. When the connection is broken, both the client device 102 and historian device 104 will invalidate the dictionaries that they generated when the connection was formed.

Figure 3:
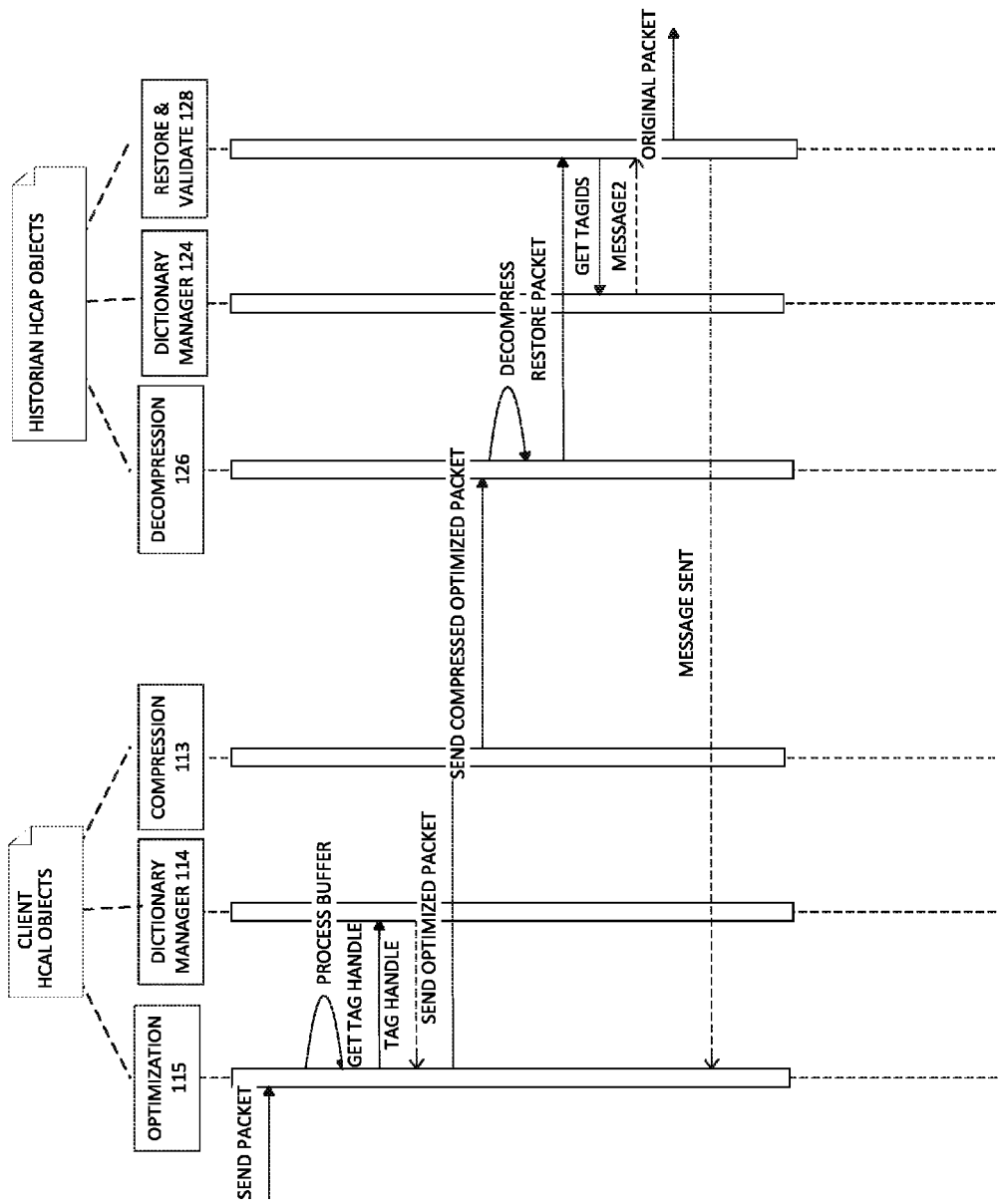
FIG. 3 is a sequence diagram of the process of sending an optimized data packet using the optimization process.

FIG. 3 is an exemplary sequence diagram of the process of sending an optimized, compressed packet 119 from the client device 102 to the historian device 104. It is assumed that a connection has already been formed between the client device 102 and historian device 104 according to the description of FIG. 2 above. The original packet 111 is sent to the client packet optimization layer 112 for processing and transmitting to the historian device 104. In an embodiment, a checksum value is generated based on the original packet using a checksum algorithm and the checksum value is included in the optimized packet 117. The client packet optimization module 115 scans the packet for tag IDs in the packet. When a tag ID is found in the packet, the client packet optimization module 115 scans the tag dictionary 114D for the tag ID and finds the tag handle which refers to the tag ID. The client packet optimization module 115 finds tag handles for each of the tag IDs in the packet in this way. The client packet optimization module 115 replaces each instance of a tag ID in the packet with the corresponding tag handle. Once the packet has been optimized, the client compression module 115 compresses the optimized packet 117 according to a general compression algorithm. For example, the packet may be compressed according to the GZip algorithm. Once compressed, the compressed optimized packet 119 is sent to the historian device 104.

The historian device 104 receives the compressed optimized packet 119. The packet is then decompressed by the historian packet decompression module 126 of the historian device 104 according to the same algorithm as used by the client device 102 to compress the packet. The packet is scanned for tag handles by the packet restoration and validation module 128. When tag handles are found, the historian packet restoration and validation module 128 uses the tag dictionary 124D to determine the corresponding tag IDs. The tag handles are replaced in the packet with the corresponding tag IDs. Preferably, the historian packet restoration and validation module 128 generates a checksum value using the same checksum algorithm as was used by the client device 102. If the generated checksum value matches the optimized data packet 117, the integrity of the packet is confirmed. The historian device 104 sends the data sent in the packet to its destination in this historian device 104.

Figure 4:
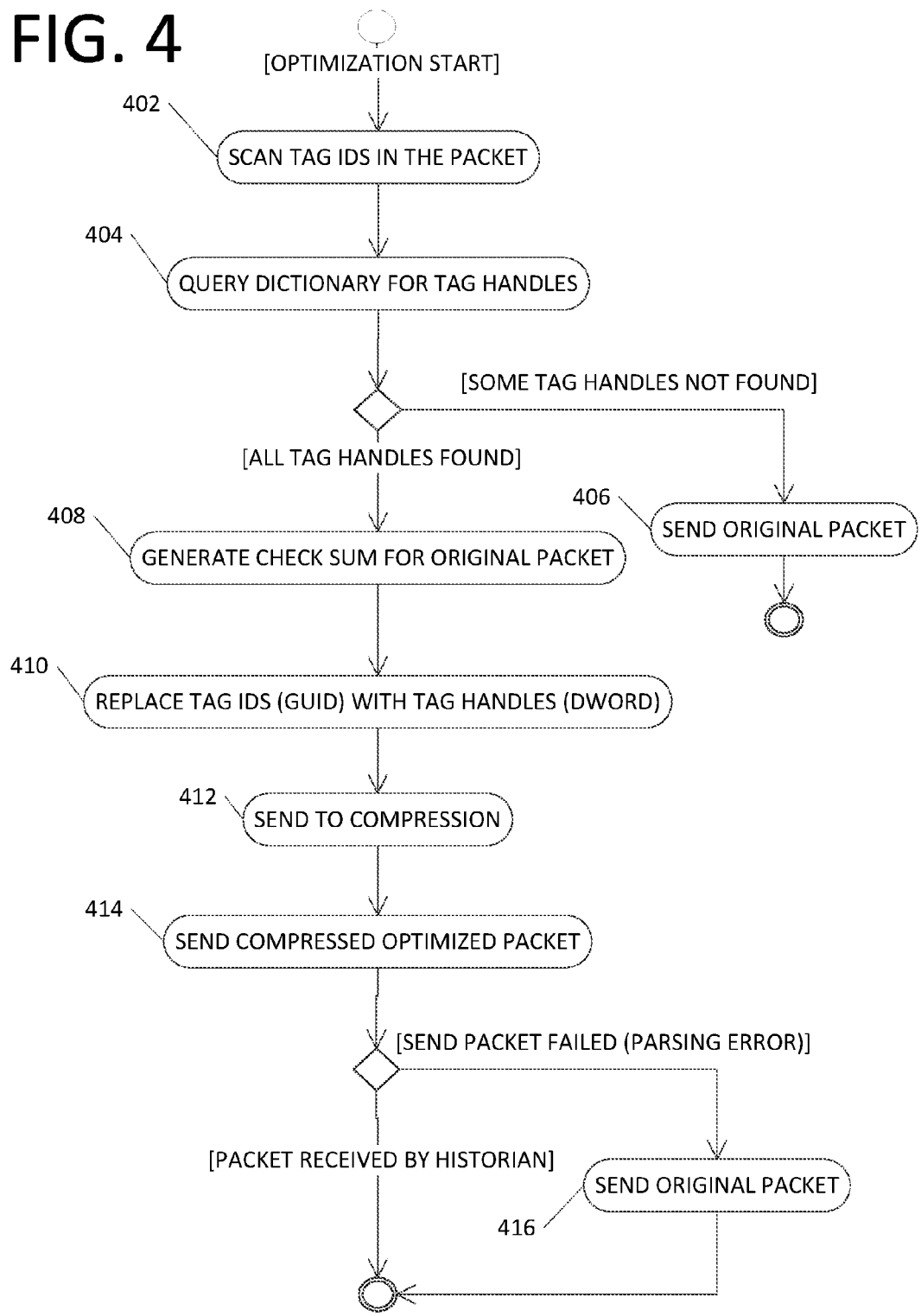
FIG. 4 is a flow diagram of the process of sending an optimized data packet using the optimization process.

FIG. 4 is an exemplary flowchart describing the process of sending an optimized, compressed packet 119 by the client device 102, which is implemented by the processor 108 executing computer executable instructions stored in memory storage device 106. In step 402, tag IDs are scanned in the original packet 111. Then, the dictionary 1124D is queried to find corresponding tag handles (step 404). If some of the tag handles are not found in the dictionary, the optimization stops and the original packet is sent (step 406). If all of the tag handles are found, a checksum is generated from the original packet (step 408). The tag IDs are replaced with the corresponding tag handles throughout the packet (step 410). Then, the packet is compressed according to a compression algorithm (step 412). The compressed, optimized packet 119 is sent to the historian device 104 (step 414). In the event that an error in sending the packet is detected, the system attempts to send the original packet instead (step 416).

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

The Abstract is provided to help the reader quickly ascertain the nature of the technical disclosure. It is submitted with the understanding that it will not be used to interpret or limit the scope or meaning of the claims.

What is claimed is:

1. A system for communicating data packets in a process control environment, said system comprising:
a client device comprising a first memory storage device and a first processor, said first memory storage device storing first processor-executable instructions for execution by the first processor, said first processor, when executing said first processor-executable instructions, configured for:
connecting, via a network, to a second processor of a historian device;
creating, via a first dictionary manager module, a first tag dictionary;
synchronizing, via the network, the first tag dictionary with a second tag dictionary created by the historian device;
optimizing a packet via a client packet optimization layer comprising:
scanning a tag ID present in the packet;
determining a matching tag handle for the tag ID from the first tag dictionary;
replacing each instance of the tag ID in the packet with the matching tag handle; and
sending the optimized packet to the historian device via the network;
the historian device comprising a second memory storage device and the second processor, said second memory storage device storing second processor-executable instructions for execution by the second processor, said second processor, when executing said second processor-executable instructions, configured for:
connecting, via the network, to the first processor of the client device;
creating, via a second dictionary manager module, the second tag dictionary;
synchronizing, via the network, the second tag dictionary with the first tag dictionary created by the client device;
receiving the optimized packet from the client device via the network;
converting the optimized packet back to its original form comprising:
scanning the packet for a tag handle present in the packet;
determining a matching tag ID for the tag handle from the second tag dictionary; and
replacing each instance of the tag handle in the packet with the matching tag ID.

2. The system of claim 1, wherein the tag ID is a Globally Unique Identifier (GUID).

3. The system of claim 1, said first processor, when executing instructions further comprising the first processor-executable instructions, further configured for generating a checksum value based on the packet before the packet is optimized and sending the checksum value with the optimized packet to the historian device via the network.

4. The system of claim 3, said second processor, when executing instructions further comprising the second processor-executable instructions, further configured for receiving the checksum value sent with the optimized packet and verifying the integrity of the packet based on the checksum value.

5. The system of claim 1, said first processor, when executing instructions further comprising the first processor-executable instructions, further configured for compressing the packet via a packet compression module according to a data compression method, said compressing performed after said replacing each instance of the tag ID with the matching tag handle.

6. The system of claim 5 said second processor, when executing instructions further comprising the second processor-executable instructions, further configured for decompressing the packet via a packet decompression module according to the data compression method used to compress the packet, said decompressing performed before said scanning the packet for the tag handle present in the packet.

7. The system of claim 1,
said second processor, when executing instructions further comprising the second processor-executable instructions, further configured for storing the original packet in said second memory storage device;
said first processor, when executing instructions further comprising the first processor-executable instructions, further configured for disconnecting from the second processor of the historian device after said storing the original packet in said second memory storage device;
said second processor, when executing instructions further comprising the second processor-executable instructions, further configured for deleting the second tag dictionary after said disconnecting; and
said first processor, when executing instructions further comprising the first processor-executable instructions, further configured for deleting the first tag dictionary after said disconnecting.

8. A method for communicating data packets in a process control environment, said method comprising:
connecting, via a network, a client device to a historian device;
creating a first tag dictionary;
synchronizing, via the network, the first tag dictionary with a second tag dictionary created by the historian device;
optimizing a packet by:
scanning a tag ID present in the packet;
determining a matching tag handle for the tag ID from the first tag dictionary;
replacing each instance of the tag ID in the packet with the matching tag handle; and
sending the optimized packet to the historian device via the network;
connecting, via the network, the historian device to the client device;
creating the second tag dictionary;
synchronizing, via the network, the second tag dictionary with the first tag dictionary;
receiving by the historian device the optimized packet from the client device via the network;
converting the optimized packet back to its original form comprising:
scanning the packet for a tag handle present in the packet;
determining a matching tag ID for the tag handle from the second tag dictionary; and
replacing each instance of the tag handle in the packet with the matching tag ID.

9. The method of claim 8, wherein the tag ID is a Globally Unique Identifier (GUID).

10. The method of claim 8, further comprising generating by the client device a checksum value based on the packet before the packet is optimized and sending by the client device the checksum value with the optimized packet to the historian device via the network.

11. The method of claim 10, further comprising receiving by the historian device the checksum value sent with the optimized packet and verifying by the historian device the integrity of the packet based on the checksum value.

12. The method of claim 8, wherein after each instance of the tag ID is replaced with the matching tag handle by the client device, a packet compression module of the client device compresses the packet according to a data compression method.

13. The method of claim 12, wherein before scanning the packet by the historian device for a tag handle present in the packet, the packet is decompressed by the historian device according to the data compression method used to compress the packet.

14. The method of claim 8, wherein after the original packet is stored by the historian device, the client device and historian device are disconnected and the first and second tag dictionaries are deleted by the client device and by the historian device, respectively.

15. A system for communicating data packets in a process control environment, said system comprising:
a client device comprising a first memory storage device and a first processor, said first memory storage device storing first processor-executable instructions for execution by the first processor, the first processor, when executing the first processor-executable instructions, providing:
a connection manager connecting, via a network, to a connection manager of a historian device;
a first dictionary manager module creating a first tag dictionary and synchronizing, via the network, the first tag dictionary with a second tag dictionary created by the historian device;
a packet optimization module optimizing a packet by scanning a tag ID present in the packet, determining a matching tag handle for the tag ID from the first tag dictionary, replacing each instance of the tag ID in the packet with the matching tag handle, and sending the optimized packet to the historian device via the network;
the historian device comprising a second memory storage device and a second processor, said second memory storage device storing second processor-executable instructions for execution by the second processor, the second processor, when executing the second processor-executable instructions, providing:
a connection manager connecting, via the network, to the connection manager of the client device;
a second dictionary manager module creating the second tag dictionary and synchronizing, via the network, the second tag dictionary with the first tag dictionary created by the client device;
a packet restoration and validation module receiving the optimized packet from the client device via the network, converting the optimized packet back to its original form, scanning the packet for a tag handle present in the packet, determining a matching tag ID for the tag handle from the second tag dictionary, and replacing each instance of the tag handle in the packet with the matching tag ID.

16. The system of claim 15, wherein the tag ID is a Globally Unique Identifier (GUID).

17. The system of claim 15, wherein the packet optimization module, provided by the first processor executing instructions therefor further comprising the first processor-executable instructions, generates a checksum value based on the packet before the packet is optimized and sends the checksum value with the optimized packet to the packet restoration and validation module of the historian device via the network.

18. The system of claim 17, wherein the packet restoration and validation module, provided by the second processor executing instructions therefor further comprising the second processor-executable instructions, receives the checksum value sent with the optimized packet and verifies the integrity of the packet based on the checksum value.

19. The system of claim 15, wherein after each instance of the tag ID is replaced with the matching tag handle by the packet optimization module of the client device, a packet compression module, provided by the first processor executing instructions therefor further comprising the first processor-executable instructions, compresses the packet according to a data compression method.

20. The system of claim 19, wherein before scanning the packet by the packet restoration and validation module of the historian device for a tag handle present in the packet, the packet is decompressed by a decompression module, provided by the second processor executing instructions therefor further comprising the second processor-executable instructions, according to the data compression method used to compress the packet.

21. The system of claim 15, wherein after the original packet is stored by the second memory storage device of the historian device, the connection manager of the client device and the connection manager of the historian device are disconnected by the first processor executing instructions therefor further comprising the first processor-executable instructions, and the first and second tag dictionaries are deleted by the first processor of the client device executing instructions therefor further comprising the first processor-executable instructions and by the second processor of the historian device executing instructions therefor further comprising the second processor-executable instructions, respectively.

* * * * *